United States Patent [19]

Kehrer

[11] Patent Number: 4,589,473

[45] Date of Patent: May 20, 1986

[54] PROCESS AND HEAT EXCHANGER FOR COOLING GASES

[75] Inventor: Wolfgang Kehrer, Berlin, Fed. Rep. of Germany

[73] Assignee: Borsig GmbH, Berlin, Fed. Rep. of Germany

[21] Appl. No.: 710,501

[22] Filed: Mar. 11, 1985

[30] Foreign Application Priority Data

Mar. 30, 1984 [DE] Fed. Rep. of Germany ....... 3411795

[51] Int. Cl.⁴ .......................... F28D 7/10; C10G 9/16
[52] U.S. Cl. .......................................... 165/1; 165/160; 122/467; 122/488; 122/7 R; 208/48 R
[58] Field of Search ................. 165/160; 122/7 R, 32, 122/158, 467, 483; 208/48

[56] References Cited

U.S. PATENT DOCUMENTS

| | | |
|---|---|---|
| 3,820,598 | 6/1974 | Fenger et al. ........................ 165/160 |
| 4,336,770 | 6/1982 | Kaneko et al. ................... 165/160 X |
| 4,346,758 | 8/1982 | Kehrer et al. ..................... 165/134.1 |
| 4,488,513 | 12/1984 | Jahnke et al. ................... 122/7 R X |

FOREIGN PATENT DOCUMENTS 3136860 4/1982 Fed. Rep. of Germany .
2913748 9/1983 Fed. Rep. of Germany .

*Primary Examiner*—William R. Cline
*Assistant Examiner*—Richard R. Cole
*Attorney, Agent, or Firm*—Max Fogiel

[57] ABSTRACT

A bundled-tube heat exchanger of the vertical arrangement type has a gas inlet chamber and a gas outlet chamber. These gas chambers are connected by gas transfer tubes. The gas transfer tubes are surrounded by cooling medium tubes within a housing chamber. Each of the cooling medium tubes opens out into a respective connecting chamber that is formed between the casing chamber, the gas inlet chamber, and the gas outlet chamber. A gas transfer tube that is open to the casing chamber connects the casing chamber to a connecting chamber.

5 Claims, 2 Drawing Figures

PROCESS AND HEAT EXCHANGER FOR COOLING GASES

BACKGROUND OF THE INVENTION

The present invention relates to a process for cooling gases that contain particles which tend to form cake-like deposits during the cooling process. The process involves heat exchange with a vaporizing coolant and an intermediate carrier that is contained in annular chambers between the gases and the cooling medium. The annular chambers are formed by double-walled tubes which are arranged within a chamber that contains the cooling medium. The present invention relates further to a heat exchanger, in particular a heat exchanger that is used for such a process.

The gases of the kind described above deposit their component parts, which either liquify or solidify during the cooling process, on the cooling surfaces. The deposits become heavier when the temperature of the cooling surfaces relative to the temperature of the gases becomes lower. If cooling is effected in tubes that are surrounded by a circulating cooling medium that vaporizes around the tubes, the gas-side surface temperature of the tube will be close to the vaporization temperature of the cooling medium, i.e., it will be relatively low. The resulting deposits of the separated components of the gases will thus be heavy, even after a brief period of operation, and will cause considerable deterioration of thermal transfer. They will also cause an elevated pressure loss of the gas.

German Pat. DE-PS No. 29 33 748 describes a heat exchanger in which a process of this sort can be carried out. In this heat exchanger, the disadvantages outlined above have been avoided by the use of a cold so-called tempering gas that is free of additives. The gas is introduced into an annular chamber formed by gas transfer tubes and cooling agent tubes, and is then mixed with the gas that is to be cooled by means of vortexing. This heat exchanger requires the availability of a specially cooled, additive-free tempering gas. In addition from the operational point of view, it is difficult to arrive at and control the correct mixture of gas and tempering gas. The heat exchanger entails higher construction costs and because of its design, the quantity of tempering gas increases with the quantity of gas.

German laid-open patent application DE-OS No. 31 36 860 describes a heat exchanger used to cool hot gases containing components that are deposited during the cooling process. This heat exchanger has double-walled tubes and cooling-medium chambers formed between two tube bases. Water is passed between the annular chambers of the double-walled tubes so that—as a result of the predominant surface temperature—deposits of coke, for example, form on the inner wall of the tubes that carry the gas. From time to time these deposits are removed either mechanically or are burned off. The double-walled tubes are arranged within an open casing that contains no cooling agent.

SUMMARY OF THE INVENTION

It is the object of the present invention to provide a process and heat exchanger for cooling gases containing components that tend to form cake-like deposits during the cooling process wherein the disadvantages and the difficulties described above are substantially eliminated without any great technical disadvantages and without the need of a special tempering gas. The mixing of the tempering gas with the gas to be cooled, requires monitoring and controlling.

The present invention provides a process wherein a cooling agent is vaporized in an outer chamber by heat exchange with gases to be cooled and the resulting vapor is passed through annular chambers as an intermediate carrier. In a heat exchanger that is used particularly for the conduct of such a process, a housing or casing and tube bases associated with cooling medium tubes define a housing or casing chamber into which an inlet for supplying a vaporizing cooling agent opens. There are one or a plurality of transfer tubes within the casing chamber. The inlet openings of these tubes are above the level of the liquid that is contained in the housing or casing chamber. The outlet of the tubes open out into a lower connecting chamber.

With the above arrangement it is possible to achieve relatively high gas-side surface temperatures and thus avoid, or considerably reduce, the formation of deposits on the tube walls.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENTS

Figure 1:
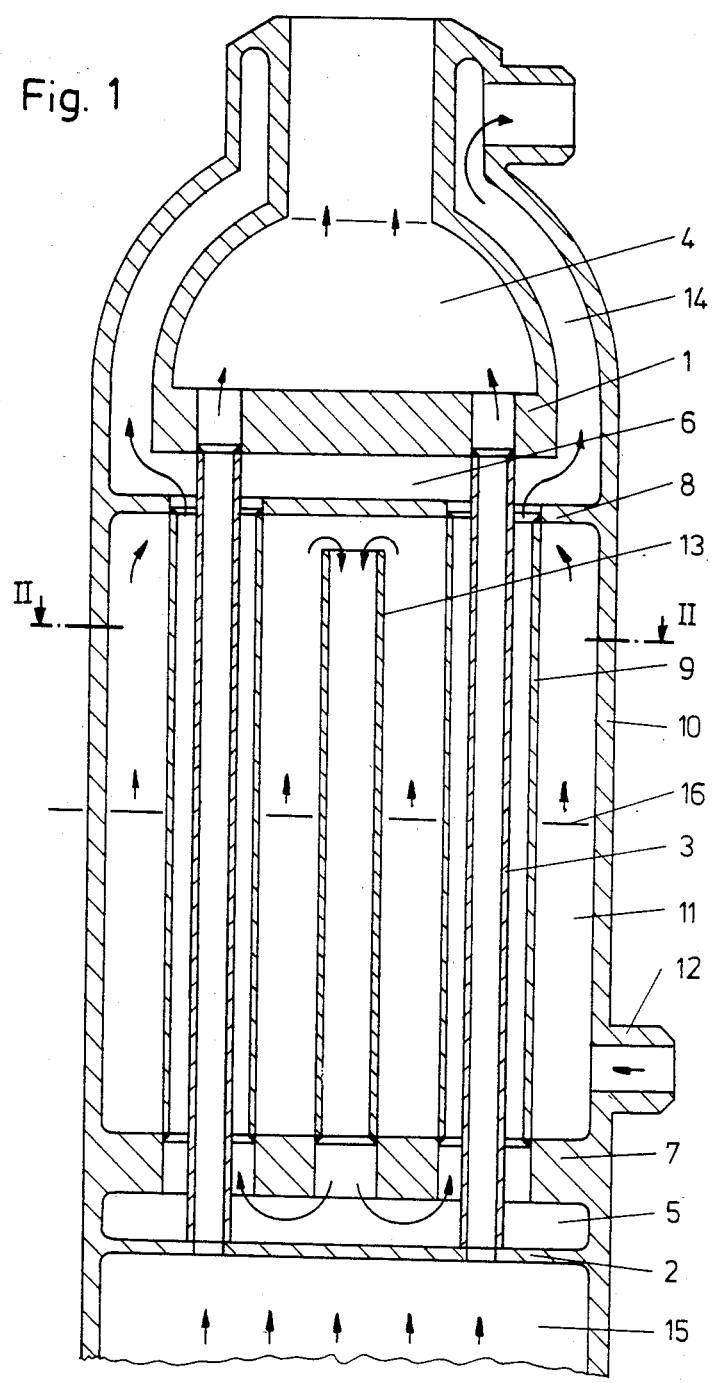
FIG. 1 is a longitudinal cross-section through a bundled-tube type heat exchanger according to the present invention.
Figure 2:
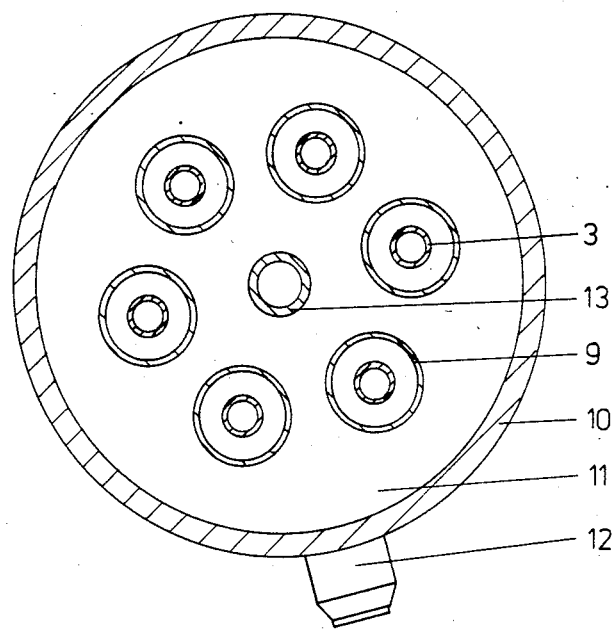
FIG. 2 is a cross-section taken along line II—II in FIG. 1.

In FIG. 1, there can be seen a bundled-tube type heat exchanger in which a plurality of tubes are in a vertical arrangement having an upper tube base 1 and a lower tube base 2 into which gas transfer tubes 3 open out. In the embodiment that is shown, gas that is to be cooled flows from a gas entry chamber 15 in the direction of the arrows, and passes through the gas transfer tubes 3 into a gas exit chamber 4. Above the gas entry chamber 15 and beneath the gas exit chamber 4 there is, in each instance, a connector chamber 5 and 6, respectively. These chambers are defined on the one side by the appropriate tube base 2 and 1, respectively, and by further tube bases 7 and 8, respectively, that are arranged at a distance from their respective tube bases 1 and 2. Cooling medium tubes 9 open into these two cooling tube bases 7 and 8 and these enclose the gas transfer tubes 3 at a distance from the gas transfer tubes. The cooling medium tubes 9 are located in an outer chamber 11 that is defined on the outside by a housing 10. The housing 10 rests on the tube base 7, is sealed against this base, and ends at the tube base 8. The housing 10 has an inlet 12 for a liquid cooling agent and an outlet 14.

A transfer tube 13 protrudes into the outer chamber 11, and this tube 13 connects the outer chamber 11 to the lower connector chamber 5. For this purpose, one end of the transfer tube 13 is set into the lower tube base 7. An opening at the other end of the transfer tube 13 is located beneath the tube base 8 that defines the upper connector chamber 6. A cooling agent level is maintained within the outer chamber 11. This level is beneath the upper opening of the transfer tube 13.

The liquid cooling medium that is introduced, is heated within the outer chamber 11 that is surrounded by the housing 10. The saturated vapor that is produced in this manner flows upwards in the direction of the arrows. This saturated vapor then passes downwards through the transfer tube 13 and into the connector chamber 5. The saturated vapor then flows upwards from this chamber to the outlet 14 that encloses the gas outlet chamber 4 in the form of an annular chamber. When flowing through the annual cross-section within the cooling medium tubes, the vapor absorbs heat from the hot gas that is to be cooled and becomes superheated. The outlet temperature of the vapor can be controlled depending on the configuration and dimensions of the heat-exchanging surfaces, and the level 16 of the liquid cooling medium within the outer chamber 11. The level 16 of the liquid cooling medium in the outer chamber 11 can be monitored by a control system (not shown herein).

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention, and therefore, such adaptations should and are intended to be comprehended within the meaning and range of equivalence of the following claims.

What is claimed is:

1. A process for cooling gases having components tending to form cake-type deposits during cooling comprising the steps of: producing a heat exchange of the gases to be cooled with a vaporizing cooling medium and an intermediate carrier passing through annular chambers between the gases and the cooling medium, said annular chambers being formed by double-walled tubes arranged within a chamber containing the cooling medium; vaporizing said cooling medium within said chamber by heat exchange with the gases to be cooled; and passing resulting vapor through said annular chambers as said intermediate carrier, said vaporized cooling medium exchanging heat with water or water vapor, said vaporized cooling medium flowing through said cooling medium tubes comprising an intermediate heat carrier medium for attaining substantially high temperatures on surfaces contacting said gases, said high temperatures reducing substantially deposits on pipe walls, said intermediate heat carrier medium being obtained from water used as cooling medium.

2. A heat exchanger for cooling gases containing components tending to form cake-like deposits during cooling comprising: a housing containing a gas inlet chamber and a gas outlet chamber; vertically arranged gas transfer tubes set into tube sheets, each said chamber being defined by one of said tube sheets and connected by said vertically arranged gas transfer tubes set; cooling medium tubes held in tube sheets spaced from the first-mentioned tube sheets associated with the gas transfer tubes, each gas transfer tube being surrounded by and spaced from a cooling medium tube, said cooling medium tubes forming passage for a vaporized cooling medium to cool said gases; said cooling medium tubes being connected to upper and lower connecting chambers; said upper connecting chamber having an outlet and being defined by said gas outlet chamber and said upper tube sheet associated with said cooling medium tubes; said lower connecting chamber being arranged between said lower tube sheet associated with said cooling medium tubes and said lower tube sheet associated with said gas transfer tubes; said housing and tube sheets associated with said cooling medium tubes defining an outer chamber; an inlet pipe opening into said outer chamber for supply of a vaporizing liquid cooling medium; at least one transfer tube having an outlet opening in said lower connecting chamber and an inlet opening located above the level of the liquid cooling medium maintained in said outer chamber, said vaporized cooling medium exchanging heat with water or water vapor, said vaporized cooling medium flowing through said cooling medium tubes comprising an intermediate heat carrier medium for attaining substantially high temperatures on surfaces contacting said gases, said high temperatures reducing substantially deposits on pipe walls, said intermediate heat carrier medium being obtained from water used as cooling medium.

3. A heat exchanger according to claim 2, wherein said upper connecting chamber has an outlet passing through a cooling housing surrounding said gas outlet chamber.

4. A heat exchanger according to claim 2, wherein gases to be cooled are passed through said gas transfer tubes in flow direction of said cooling medium within said cooling medium tubes.

5. A heat exchanger according to claim 2, wherein gases to be cooled are passed through said gas transfer tubes against flow direction of said cooling medium within said cooling medium tubes.

* * * * *